United States Patent [19]
Howells
[11] 3,909,785
[45] Sept. 30, 1975

[54] APPARATUS FOR RECOGNIZING HAND PRINTED CHARACTERS

[75] Inventor: Joseph A. Howells, Ridgefield, Conn.
[73] Assignee: Amperex Electronics Corporation, Hicksville, N.Y.

[22] Filed: Nov. 12, 1973
[21] Appl. No.: 414,700

[52] U.S. Cl. ........................................ 340/146.3 SY
[51] Int. Cl.$^2$ ........................................ G06K 9/10
[58] Field of Search ........ 340/146.3 SY, 146.3 MA, 340/146.3 E, 146.3 J

[56] References Cited

UNITED STATES PATENTS

| | | | |
|---|---|---|---|
| 3,342,935 | 9/1967 | Leifer | 340/146.3 SY |
| 3,487,371 | 12/1969 | Frank | 340/146.3 SY |
| 3,705,956 | 12/1972 | Dertouzos | 340/146.3 SY |
| 3,761,877 | 9/1973 | Fernald | 340/146.3 SY |

*Primary Examiner*—Leo H. Boudreau
*Attorney, Agent, or Firm*—Martin Novack, Esq.

[57] ABSTRACT

An apparatus which receives manually formed characters and generates output signals indicative of the characters and their locations. In accordance with the invention there is provided a data surface having a plurality of defined character regions, each region having a plurality of defined sectors. Means are provided for generating digital signals representative of each of a succession of positional coordinates that are traversed when manually entering characters in the character regions. Sector classifying means are responsive to the digital signals for generating a current sector signal which identifies the sector in which the current digital coordinate is located. Memory means are provided for storing a plurality of memory states, each state being representative of a predetermined sequence of sectors which reflect the partial or complete formation of at least one particular character. The memory means are operative in response to the current sector signal as well as to its own previous state for generating state signals which represent its latest state. Means are also provided for indicating the completion of a manually formed character. Finally, output means are responsive to the completion indication for generating character-indicative output signals in accordance with the latest state. In a preferred embodiment of the invention, region classifying means are responsive to the digitial signals for generating a current region signal which identifies the region in which the current digital coordinate is located. In this embodiment, the output means indicates region information as well as character information.

14 Claims, 6 Drawing Figures

APPARATUS FOR RECOGNIZING HAND PRINTED CHARACTERS

BACKGROUND OF THE INVENTION

This invention relates to character recognition systems and, more particularly, to an apparatus which receives manually formed characters on a data surface and generates output signals indicative of the characters and their locations on the data surface.

There have been previously devised many types of systems which recognize printed characters or symbols, most of such systems employing optical scanning techniques. The complexity of such systems depends to a large extent on the number of characters to be recognized and their sizes and shapes. In general, though, systems which involve optical scanning are relatively complex and expensive so their application is limited.

Another type of character recognition is possible when the positional coordinates of hand printed characters are continuously available from a "surface digitizer" such as a data tablet. Surface digitizers are in widespread use for entering graphical information into a computer. There are many techniques of surface digitization including coupling by a magnetic "pen" to a tablet which includes a grid of wires or sonic detection of the location of a sound-producing pen. A characteristic of all these systems is the generation of digital information which represents the two-dimensional coordinates of the pen (or other point indicator) with respect to reference axes on a data surface. It has been suggested that characters hand written on a data surface could be machine recognized by monitoring sequences of coordinates and performing pattern recognition operations. The equipment for achieving this, however, should not be unduly complex or expensive so the equipment could be utilized in widespread applications.

The U.S. Pat. No. 3,676,848 of Hall et al. discloses a system which is intended to recognize hand drawn characters entered on a data surface. The data surface is divided into a plurality of areas, each of the areas accomodating a character and divided into a plurality of zones corresponding to digitizing locations on the surface. A "zone register" is utilized to detect the zones which are entered and a "line segment detector" compares consecutive zone pairs and generates a coded output which indicates the positions of the two zones as well as the direction of the zone-to-zone transition. A series of coded outputs of this type (called "line segments") are stored in a "line segment register" and, when a character is completed, its series of stored line segments are compared to data in a memory to obtain a "match" which identifies the character that has been drawn.

The described technique of Hall et al. appears satisfactory but it would be most advantageous to achieve recognition of hand printed characters with equipment of even less complexity and a minimum of required memory capacity. It is one object of the present invention to provide an improved system for the recognition of hand printed characters.

SUMMARY OF THE INVENTION

The present invention is directed to an apparatus which receives manually formed characters and generates output signals indicative of the characters and their locations. In accordance with the invention there is provided a data surface having a plurality of defined character regions, each region having a plurality of defined sectors. Means are provided for generating digital signals representative of each of a succession of positional coordinates that are traversed when manually entering characters in the character regions. Sector classifying means are responsive to the digital signals for generating a current sector signal which identifies the sector in which the current digital coordinate is located. Memory means are provided for storing a plurality of memory states, each state being representative of a predetermined sequence of sectors which reflects the partial or complete formation of at least one particular character. The memory means are operative in response to the current sector signal as well as to its own previous state for generating state signals which represent its latest state. Means are also provided for indicating the completion of a manually formed character. Finally, output means are responsive to the completion indication for generating character-indicative output signals in accordance with the latest state.

In a preferred embodiment of the invention, region classifying means are responsive to the digital signals for generating a current region signal which identifies the region in which the current digital coordinate is located. In this embodiment, the output means indicates region information as well as character information.

Further features and advantages of the invention will become more readily apparent from the following detailed description when taken in conjunction with the accompanying drawings.

DESCRIPTION OF THE PREFERRED EMBODIMENT

Figure 1:
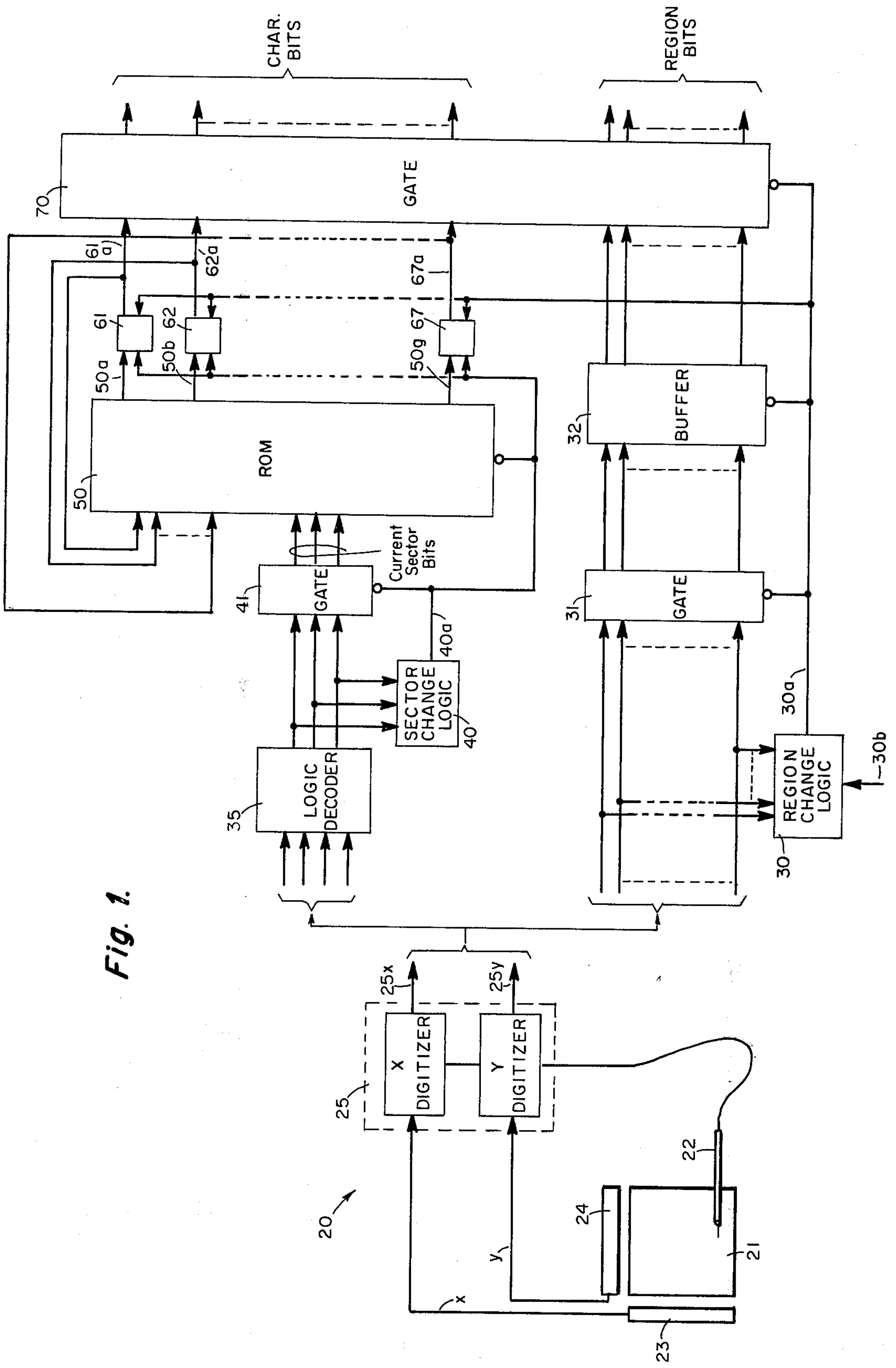
FIG. 1 is a block diagram of an embodiment of an apparatus in accordance with the invention.

Referring to FIG. 1, there is shown a block diagram of an apparatus in accordance with the invention. A coordinate digitizer 20 is illustrated as including a data surface 21 and an associated stylus or "data pen" 22. In the present embodiment the writing tip of stylus 22 emits pulses of sound energy and the positional coordinates of the tip on surface 21 are continuously detectable. Specifically, a pair of elongated microphones 23 and 24 are disposed along two adjacent edges of data surface 21. These microphones, designated the $x$ and $y$ microphones, respectively, receive the sound wavefront of each emitted sound pulse. The transit time of the sound energy to each microphone is computed by $x$ and $y$ digitizing circuitry 25 which generates digital signals 25x and 25y that are representative of the $x,y$ coordinates of the stylus position. Coordinate digitizers of this type are known in the art and are described, for example, in copending U.S. application Ser. No. 841,058 filed July 11, 1969, and entitled "Graphical Data Device". A suitable coordinate digitizer is available commercially from Science Accessories Corporation, Southport, Conn., and is sold under the trademark "Graf/Pen". It will become apparent that various alternate surface digitizers are suitable for use in the present invention.

Figure 2:
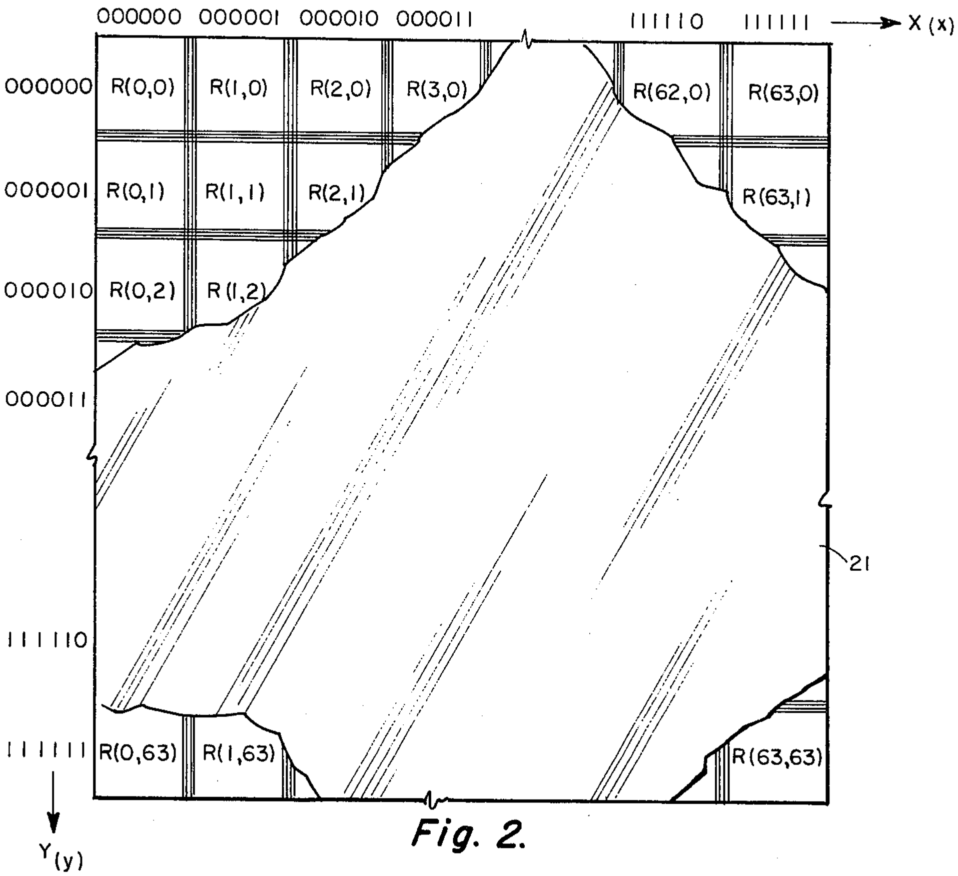
FIG. 2 illustrates the division of the data surface of FIG. 1 into a plurality of character regions that are suitable for use in the present embodiment.

Referring momentarily to FIG. 2, the data surface 21 is depicted as being divided into a plurality of square regions labelled R(0,0) through R(63,63). The regions on surface 21 can be thought of as forming a 64 × 64 array with members R(X,Y) having coordinates that are defined by the binary designations along the edges defining X and Y axes. The $x$ and $y$ digital coordinates generated by the Science Accessories Corporation coordinate digitizer lend themselves particularly well to defining array regions as shown in FIG. 2. Specifically, the $x$ and $y$ coordinates of the points on the data surface 21 are each represented by a twelve bit binary number. The six most significant bits (i.e., the six leftmost bits for each coordinate) define the ranges which corresponds to the region boundaries shown in FIG. 2 and are designated by the capital letters X and Y. For example, the point on data surface 21 having an $x$ coordinate 00011101010 and a $y$ coordinate 000001110011 would lie in region R(3,1) since X (defined by the six most significant bits of the $x$ coordinate) is 000011 and Y (defined by the six most significant bits of the $y$ coordinate) is 000001. Decimal representations are used in the parentheses of R(X,Y) for the sake of brevity.

The regions may typically be printed on a paper form which can be placed on the data surface 21 when it is desired to input hand printed characters to a computer or the like.

Figure 3:
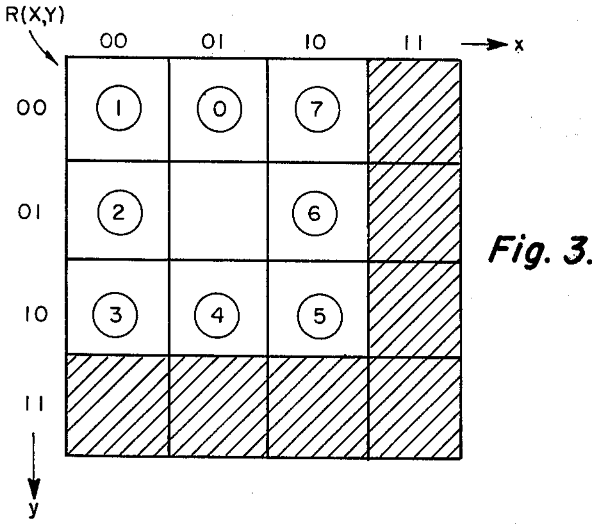
FIG. 3 is an enlarged view of a single region of FIG. 2 and shows the division of the region into sectors in accordance with the present embodiment.

FIG. 3 shows an enlargement of a single region R(X,Y) which is seen to be divided into 16 sectors by dashed lines. The edges of the region defining the sectors are denoted by two bit binary numbers which, in the present embodiment, are the seventh and eighth most significant bits of the $x$ and $y$ coordinates of points on the data surface. For reasons which will become apparent, only eight of the sectors are designated by decimal numbers which are shown in circles in FIG. 3. The relationship between the $x$ and $y$ bits of the eight sectors and their decimal designations are indicated in the following Table:

| $x$ | $y$ | sector number |
|---|---|---|
| 01 | 00 | 0 |
| 00 | 00 | 1 |
| 00 | 01 | 2 |
| 00 | 10 | 3 |
| 01 | 10 | 4 |
| 10 | 10 | 5 |
| 10 | 01 | 6 |
| 10 | 00 | 7 |

The sectors in the shaded areas form the borders between adjacent regions (as can be seen in FIG. 2) and are not assigned sector numbers. The center one of the remaining nine is not utilized in the present embodiment for reasons to be set forth, so it also is not assigned a sector number.

It follows from the foregoing that the eight most significant bits of the $x$ and $y$ coordinates of any given point on the data surface 21 define the region and sector within which the point lies. For example, a point having the coordinate $x$=000111010110, $y$=010111101101 is identified as being in sector 4 of region R(7,23). The six most significant digits of the $x$ and $y$ coordinates correspond to "7" and "23" in binary form and the seventh and eight most significant digits of the $x$ and $y$ coordinates are "01" and "10" respectively, which identifies the sector from the Table above. The four least significant bits are not needed to identify sector and region. As another example, the point $x$=100110000010, $y$=010101001111 is identified as being in sector 1 of region R(38,21).

Returning to FIG. 1, the $x$ and $y$ coordinates were seen to be available from digitizing circuitry 25. The twelve bits defining the regions (i.e., the six most significant bits of the $x$ coordinate and the six most significant bits of the $y$ coordinate) are coupled to a "region change logic" module 30 and through a 12 level gate 31 to a "region buffer" 32. The purpose of the region change logic module 31 is to determine when a new character region R(X,Y) has been entered by the data pen with which the hand printed characters are being drawn. The module 31 may comprise a comparator which generates an output pulse on a line 30A whenever there is a change in the 12 region-representative bits. The region buffer couples 12 bits of region information to a gate 70 which will be described further hereinbelow.

The four bits defining sector information (i.e., the seventh and eighth most significant bits of the $x$ coordinate and the seventh and eighth most significant bits of the $y$ coordinate) are coupled to a logic decoder 35 which generates the three bit binary representation of the sector designations listed in the above Table. Three bits are sufficient to represent the eight possible sectors and these three "sector bits" are coupled to a "sector change logic" module which generates a pulse on a line 40A when there is a change in the three sector bits. Again, a comparator can be employed for this purpose. The three sector bits are also coupled through a three level gate 41 to four of the input terminals of a read-only memory (ROM) 50. The gate 41 is enabled by the signal on line 40A to pass the sector bits to ROM 50. Thus, when a new sector is entered the latest sector bits are immediately coupled as inputs to ROM 50. For convenience of explanation, the latest sector in which the data pen is located is hereinafter referred to as the "current sector" and the three data bits representative of the current sector are called the "current sector bits".

The ROM 50 generates seven output bits, each combination of which represents an output "state" of the ROM. There are 128 possible output states as represented by the binary signals on output lines 50A through 50G. These lines are respectively coupled to the input terminal of each of seven binary latches 61 through 67. The latches, which may comprise "D-type" flip-flops, each operate to sense and hold the binary state at its input terminal upon receipt of a signal at a secondary input or "clocking" terminal. The clocking terminals of all seven latches are each coupled to line 40A so that they receive a pulse whenever a new sector has been entered. The binary states of the seven latches 61 through 67 are continuously indicated on seven output lines labelled 61A through 67A, respectively. These seven lines are fed back to seven additional input terminals of the ROM 50 which thus has a total of 10 input terminals. The lines 61A through 67A are also coupled to gate 70 which is enabled by the signal on line 30A. The signal on line 30A also serves to reset the latches 61 through 67. When a full character has been hand printed in a particular region, the entering of a new region by the data pen will enable the gate 70 to generate seven upper bits which represent the character just completed and twelve lower bits which represent the region in which the character has been entered. This information can then be entered in a computer or other utilization circuitry.

In the present invention characters are recognized by determining the sequence of sectors which are traversed in each character region. The output state of the ROM 50 reflects the "history" of sectors which have been traversed and the three sector bits reflect the current sector in which the data pen is located. The ROM 50 is programmed with the appropriate predetermined sequences of sectors which are traversed during the partial or complete formation of all characters in the system's "library". As previously noted, there are 128 available output states which are sufficient for a complete set of alphanumeric characters where a single sector sequence is prescribed for each character. Each time a new sector is entered the three current sector bits are fed to the ROM in conjunction with the seven bits which represent the previous state of the ROM. The ROM then generates a new seven bit output state which represents an updated history of the sequence of sectors traversed. In the present embodiment the end of a character is determined by the entry of the data pen into a new character region. This occurrence causes a signal on line 30A which enables the gate 70 to read out the latest state of ROM 50 that had been stored in the latches 61 through 67. The region bits for the region just exited had been stored in buffer 32 and are simultaneously read out when the gate 70 is enabled. The signal on line 30A also operates to reset the latches 61 through 67 to an initialized state (for example, 0100000, selected for reasons to become apparent) so that the first sector bits for the new character region can be intelligently received by ROM 50.

Figure 4:
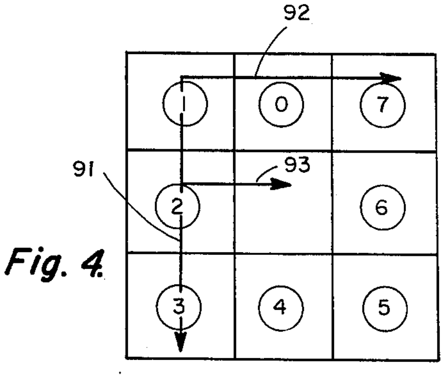
FIG. 4 shows the manner in which an "F" is hand printed in a character region of the present embodiment.

Referring to FIG. 4, there is shown the active portion of a character region in which an "F" has been hand printed using a prescribed sequence of strokes indicated by the arrows 91, 92 and 93. It is seen that the sequence of sectors traversed is 1-2-3-1-0-7-2. In the library of characters of the present embodiment this sequence of characters uniquely defines an F and after the sequence is complete the system will generate an output signal which indicates that an F has been drawn. The following Table shows the output states (with decimal equivalents) generated by ROM 50 at the various stages of the sequence of sectors traversed when an F is hand printed.

| Current Sector | ROM Output State | ROM Output State (decimal) |
|---|---|---|
| initialize | (0100000) | 32 |
| 1 | 1001000 | 72 |
| 2 | 1001101 | 77 |
| 3 | 0101000 | 40 |
| 1 | 1001110 | 78 |
| 0 | 1001111 | 79 |
| 7 | 1010000 | 80 |
| 2 | 0000110 | 6 |

Operation of the system of FIG. 1 during the printing of an F would be as follows. When a new region is entered the region change logic 30 generates a signal on line 30A which, inter alia, resets the latches 61 through 67 to the "initialize" state 0101000 (32 in decimal form). This is not the true output state of ROM 50 so it is shown in parenthesis in the Table, but these seven "initialize" bits can be considered as available at the ROM input. When the three sector bits 001 (representative of sector 1) are received at the remaining ROM input terminals, the ROM is preprogrammed to generate an output state 1001000 (72 in decimal form). The enable pulse on line 40A enables the ROM output and also enables the latches 61 through 67 to store the new output state. This new output state (1001000) has a unique meaning in the program utilized in the present embodiment; viz., that sector 1 of a character region has been (or is being) traversed. Until the time when another sector is entered, the sector change logic 40 will not generate a pulse on line 40A and the latches 61 through 67 will continue to store the same output state. When sector 2 is entered during generation of the stroke 91 (FIG. 4), the sector change logic 40 will generate a pulse on line 40A and the ROM 50 will "see" the seven state bits 1001000 and the three new sector bits 010. Enabled by the pulse on line 40A, the ROM 50 responds by generating a new output state 1001101 (77 in decimal form) and this output state is stored by the latches 61 through 67. In the program utilized in the present embodiment this new output state means that sector 1 and then sector 2 have been traversed in sequence. In the same manner, and as the letter F is formed in its entirety, the ROM output assumes the states indicated in the Table with the state 0000110 (6 in decimal form) finally being obtained during the last stroke 93. When the F is complete a new character region will generally be entered and region change logic 30 will generate a pulse on line 30A. This causes the readout of the final state 0000110 as the "character bits" and simultaneous readout of the 12 previously stored region-representative bits. In a case where the F was the last character to be printed, the operator would activate an "end of text" signal on line 30B which causes the logic 30 to generate a signal 30A which, in turn, causes readout of the final character and its region location.

In the present embodiment of the invention the final state for each character, i.e. the character bits ultimately read out, are made to correspond to the ASCII code designation for the particular character. For example, the character bits for F are seen to be 0000110 (6 in decimal form) which is the ASCII code for F. As a further example, the character bits for "S" are 0001011 (19 in decimal form) which is the ASCII code for S. The bit combinations used for the intermediate states uniquely represent these states but need have no standard coded meaning like the final character bits. An exception is the initialize state 0010000 (32 in binary form) which is the ASCII code designation for "space". This coding designation allows obtainment of a direct readout of the space code digits when a region is skipped during hand printing. The ASCII-compatible features facilitate processing by equipment which ultimately receives the final character bits.

The present embodiment provides for only a single allowed sequence of sector traversals to form each character. As an example, the F must be formed using the sector sequence 1-2-3-1-0-7-2 as shown in FIG. 4.

Other possible sequences, such as 1-0-7-2-1-2-3, would not be recognized in the present embodiment as an F. Thus, it is suggested that a user "train" beforehand to print characters in the prescribed manner which corresponds to the programming of the equipment. This is not overly difficult since most people print the majority of characters with a particular sequence of strokes. This limitation of the present embodiment is felt to be outweighed by the great cost advantage and lack of complexity of the system. A single 1024 × 7 ROM is all the memory required. It will be appreciated, however, that alternate sequences for each character could be provided for by increasing the memory size so that more ROM output states are available. The omission of the central portion of each region from the sector assignments is found to offer advantage in minimizing the number of sequences required for a given set of characters.

Figure 5A:
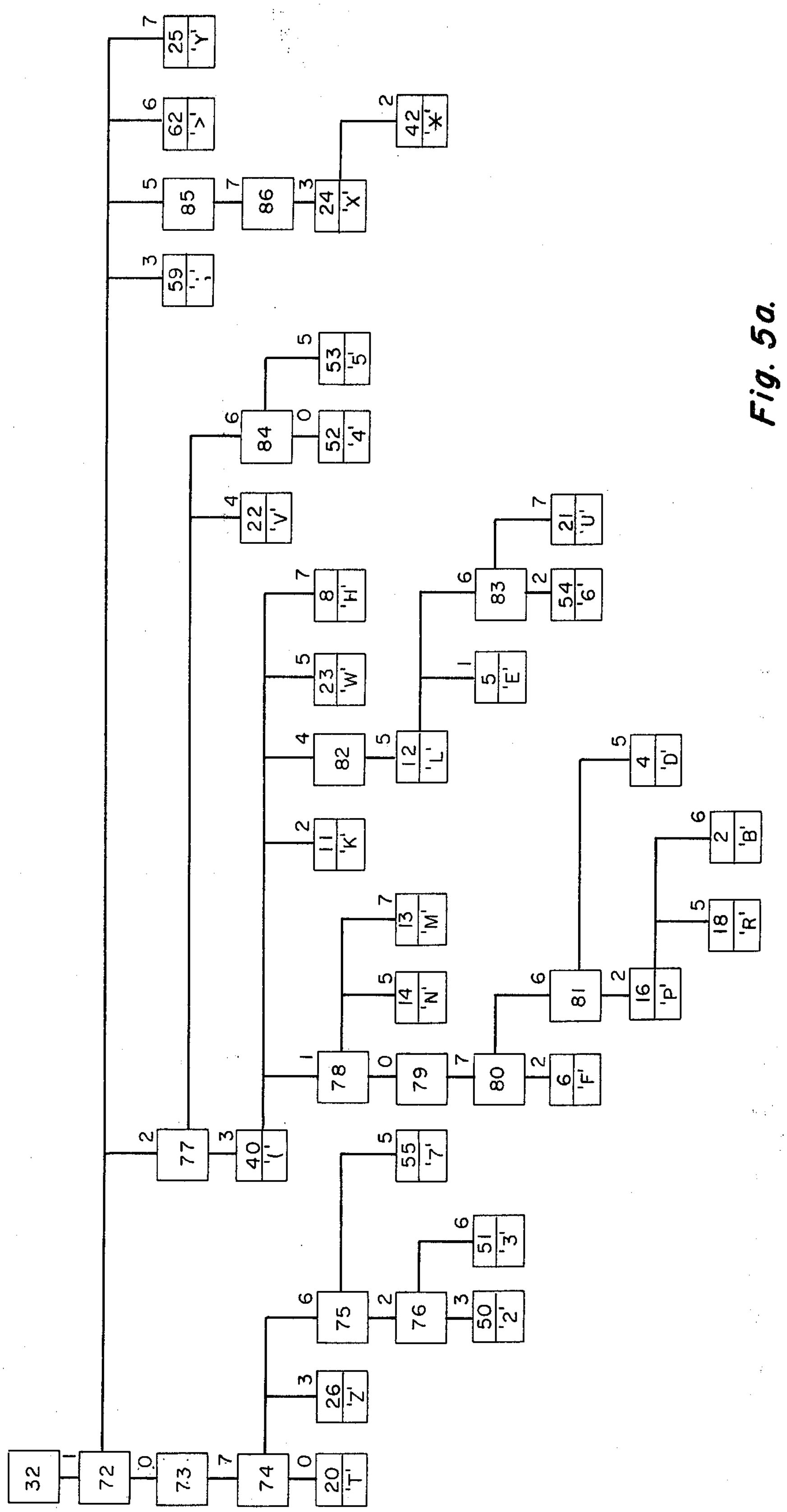
FIGS. 5A and 5B, taken in conjunction, show a state "tree" that defines the programming of the read-only memory of FIG. 1 of the present embodiment.
Figure 5B:
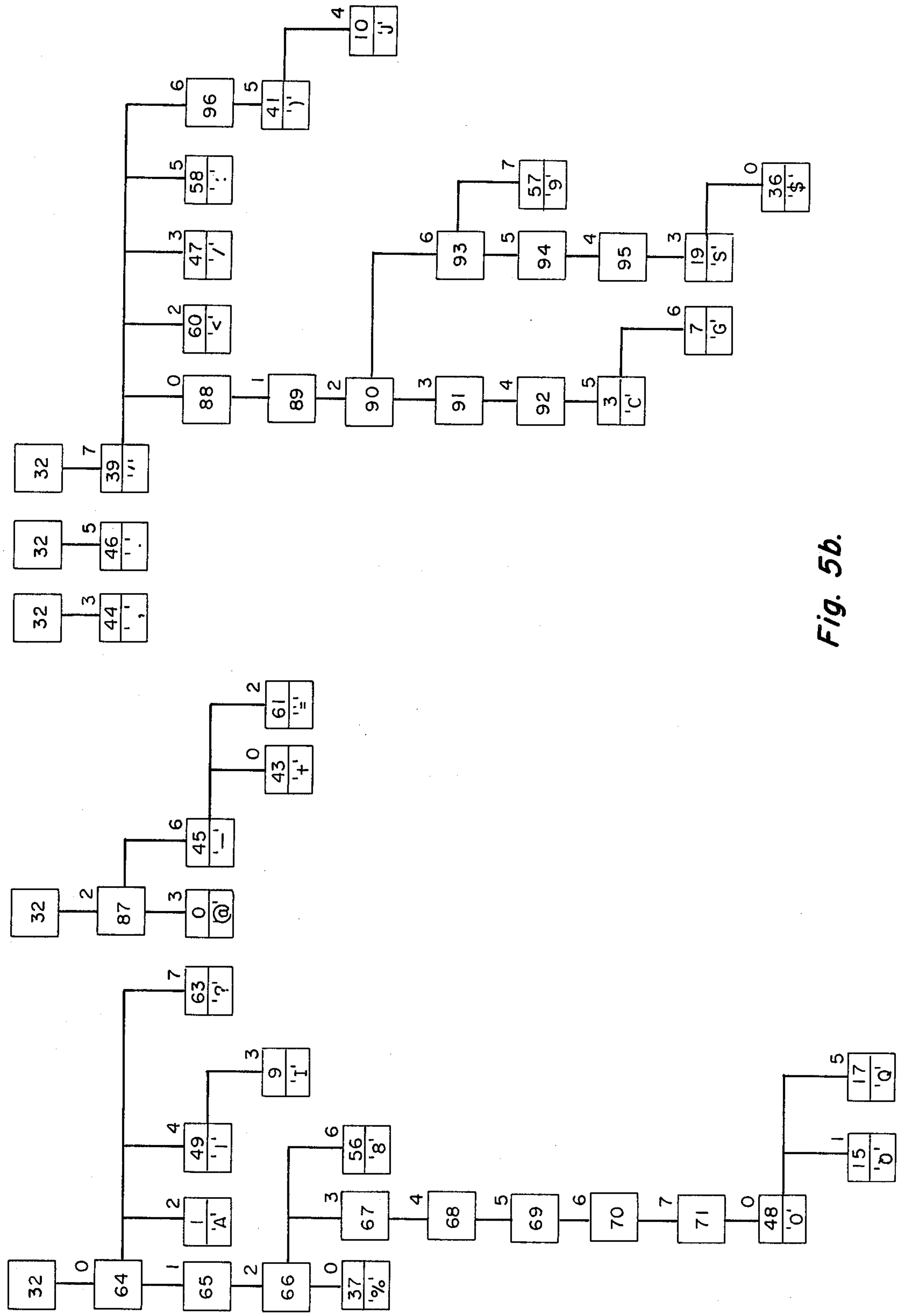

FIGS. 5A and 5B, taken in conjunction, show a state tree that defines the programming of ROM 50 for the present embodiment. Each rectangle in the FIGURES contains the decimal equivalent of the seven bit output state of ROM 50 for a given sequence of sectors. It is seen that the initial output state is 32 (ASCII for space) in all cases. All subsequent states depend on the sequence of sectors traversed, and the new sector which yields each state is shown directly above each rectangularized state. The final states, which are the character bits to be read out, are shown as having a second attached lower rectangle which contains the particular character. Every final state can be seen to correspond to the ASCII code for its accompanying character. As an example, the "branch" for the F is seen to reflect the sequence of states set forth in the Table above. Specifically, in FIG. 5A entering sector 1 yields state 72 (decimal) and subsequently entering sector 2 yields state 77, and so on, until the final state 006 is reached.

Another example is the letter "K" which has the same sequence of states as F until state 040. When sector 2 is then entered the state 011 (the ASCII code for K) is generated. It can be noted that the actual printing of the character need not be complete for the final state to be reached. If the sequence of sectors traversed uniquely defines the character to be formed, the final state for that character can be immediately generated. In the case of the K, after the vertical stroke has been drawn the data pen is positioned in sector 2 to continue printing of the character. At this stage the K is uniquely defined since no other character in the systems library involves this sequence of sectors. The ROM 50, upon receiving further sector bits after the final K state 011 (decimal), is programmed to regenerate state 011. This is also the case for all other final states.

The invention has been described with reference to a particular embodiment but it will be appreciated that variations within the spirit and scope of the invention will occur to those skilled in the art. For example, the sectors shown in FIG. 3 could have different shapes or formats. Also, the logic decoder 35 may be eliminated by providing a ROM with an additional input terminal so that four sector bits instead of three can be received. In this case the sector classifying means, referred to in the SUMMARY, would merely comprise the lines carrying the seventh and eighth most significant bits of the $x$ and $y$ coordinates.

I claim:

1. An apparatus which receives manually formed characters and generates output signals indicative of the characters, comprising:

a data surface having a plurality of defined character regions, each region having a plurality of defined sectors;

means for generating digital signals representative of each of a succession of positional coordinates that are traversed when manually entering characters in said character regions;

sector classifying means responsive to said digital signals for generating a current sector signal which identifies the sector in which the current coordinate is located;

memory means for storing a plurality of memory states each of which is representative of an expected predetermined sequence of sectors which reflect the partial or complete formation of at least one particular character, said memory means generating state signals indicative of one of its states;

means for coupling the current sector signal as an input to said memory means;

means for providing the previous output state signals as a further input to said memory means which is operative in response to the current sector signal and to its previous state for generating state signals which represent its latest;

means for indicating the completion of a manually formed character; and output means responsive to said completion indication for generating the character-indicative output signals in accordance with the latest state.

2. An apparatus as defined by claim 1 further comprising region classifying means responsive to said digital signals for generating a region-indicative signal which identifies the region in which the current coordinate is located.

3. An apparatus as defined by claim 2 wherein said output means is responsive to said completion indication for generating region-indicative signals as well as character-indicative signals.

4. An apparatus as defined by claim 1 wherein said memory means comprises a read-only memory.

5. An apparatus as defined by claim 3 wherein said memory means comprises a read-only memory.

6. An apparatus as defined by claim 1 wherein said memory means is programmed by selecting as the final state for each character the ASCII code digital representation of the character.

7. An apparatus as defined by claim 1 wherein said means for indicating the completion of a manually formed character comprises region change logic circuitry for generating a completion indication each time a new character region is entered.

8. An apparatus as defined by claim 1 further comprising sector change logic circuitry for detecting entry into a new sector and thereupon enabling a change of state of said memory means.

9. An apparatus which receives manually formed characters and generates output signals indicative of the characters, comprising:

a data surface having a plurality of defined character regions, each region having a plurality of defined sectors;

means for generating digital signals representative of each of a succession of positional coordinates that are traversed when manually entering characters in said character regions, said digital signals having most significant bits that represent the current region in which the current coordinate is located and less significant bits that represent the current sector in which the current coordinate is located;

memory means for storing a plurality of memory states, each state being representative of an expected predetermined sequence of sectors which reflect the partial or complete formation of at least one particular character, said memory means being operative in response to the less significant bits and to its previous state for generating state signals which represent its latest state;

means for indicating the completion of a manually formed character; and output means responsive to said completion indication for generating the character-indicative output signals in accordance with the latest state and region indicative signals in accordance with the most significant bits.

10. An apparatus as defined by claim 9 wherein said memory means is programmed by selecting as the final state for each character the ASCII code digital representation of the character.

11. An apparatus as defined by claim 9 wherein said means for indicating the completion of a manually formed character comprises region change logic circuitry for generating a completion indication each time the most significant bits change.

12. An apparatus as defined by claim 9 further comprising sector change logic circuitry for detecting a change in the less significant bits and thereupon enabling a change of state of said memory means.

13. An apparatus which receives manually formed characters and generates output signals indicative of the characters, comprising:

a data surface having a plurality of defined character regions, each region having a plurality of defined sectors;

means for generating digital signals representative of each of a succession of positional coordinates that are traversed when manually entering characters in said character regions;

sector classifying means responsive to said digital signals for generating a current sector signal which identifies the sector in which the current coordinate is located;

region classifying means responsive to said digital signals for generating a region-indicative signal which identifies the region in which the current coordinate is located;

memory means for storing a plurality of memory states, each state being representative of an expected predetermined sequence of sectors which reflect the partial or complete formation of at least one particular character, said memory means being operative in response to the current sector signal and to its previous state for generating state signals which represent its latest state;

means for indicating the completion of a manually formed character; and output means responsive to said completion indication for generating region-indicative signals and the character-indicative output signals in accordance with the latest state.

14. An apparatus as defined by claim 13 wherein said memory comprises a read-only memory.

* * * * *

UNITED STATES PATENT OFFICE
CERTIFICATE OF CORRECTION

PATENT NO. : 3,909,785
DATED : September 30, 1975
INVENTOR(S) : Joseph A. Howells It is certified that error appears in the above-identified patent and that said Letters Patent are hereby corrected as shown below:

col. 3, line 26 "00011101010" should be

--000011101010--.

col. 8, line 28 after "latest" insert --state--.

Signed and Sealed this

*third* Day of *February 1976*

[SEAL]

*Attest:*

RUTH C. MASON
*Attesting Officer*

C. MARSHALL DANN
*Commissioner of Patents and Trademarks*